United States Patent [19]

Jäger

[11] Patent Number: 4,841,030
[45] Date of Patent: Jun. 20, 1989

[54] AZO REACTIVE DYESTUFFS

[75] Inventor: Horst Jäger, Koeln-Buchheim, Fed. Rep. of Germany

[73] Assignee: Bayer Aktiengesellschaft, Leverkusen, Fed. Rep. of Germany

[21] Appl. No.: 327,337

[22] Filed: Dec. 4, 1981

Related U.S. Application Data

[63] Continuation of Ser. No. 166,436, Jul. 7, 1980, abandoned, which is a continuation of Ser. No. 6,023, Jan. 24, 1979, which is a continuation of Ser. No. 299,659, Oct. 24, 1979, abandoned, which is a continuation of Ser. No. 881,925, Dec. 3, 1969, abandoned.

[30] Foreign Application Priority Data

Dec. 7, 1968 [DE] Fed. Rep. of Germany ....... 1813438

[51] Int. Cl.$^4$ .................... C09B 62/085; C09B 62/09; C09B 62/245; C09B 62/405
[52] U.S. Cl. ..................... 534/638; 534/617; 534/632; 534/633; 534/634; 534/635; 534/636; 534/637; 534/640; 534/641; 534/642; 534/643; 534/832; 534/879; 534/880
[58] Field of Search .......................... 260/153; 534/638

[56] References Cited

U.S. PATENT DOCUMENTS

| | | | |
|---|---|---|---|
| 2,892,828 | 6/1959 | Stephen | 260/153 |
| 2,950,165 | 8/1960 | Hadfield et al. | 260/153 X |
| 2,951,072 | 8/1960 | Tilley et al. | 260/153 |
| 3,038,893 | 6/1962 | Andrew | 260/153 X |
| 3,157,630 | 11/1964 | Stephen et al. | 260/153 X |

Primary Examiner—Floyd D. Higel
Attorney, Agent, or Firm—Sprung Horn Kramer & Woods

[57] ABSTRACT

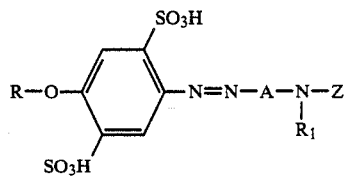

wherein R denotes optionally substituted lower alkyl, A the radical of an optionally substituted lower alkyl, $R_1$ hydrogen or optionally substituted lower alkyl and Z a reactive group.

They are useful for dyeing and printing materials containing hydroxyl groups or amide groups.

3 Claims, No Drawings

AZO REACTIVE DYESTUFFS

This is a continuation of application Ser. No. 166,436, filed July 7, 1980, now abandoned, which in turn is a continuation of Ser. No. 006,023, filed 1/24/79, which in turn is a continuation of Ser. No. 299,659, filed 10/24/79, now abandoned, which in turn is a continuation of Ser. No. 881,925, filed 12/3/69, now abandoned.

The invention relates to new azo reactive dyestuffs which correspond to the general formula (I)

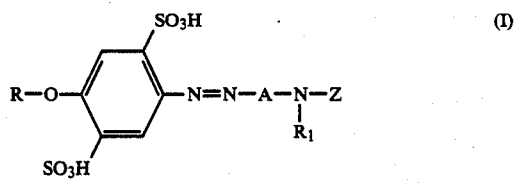

Herein R denotes lower alkyl with 1 to 5 C atoms or cycloalkyl, it being possible for these radicals to be substituted, A denotes the radical of an optionally substituted azo component, $R_1$ denotes hydrogen or optionally substituted lower alkyl and Z denotes a reactive group. The radical R can for example be the methyl, ethyl, propyl, isopropyl, β-methoxyethyl, n-butyl, isobutyl, tertiary butyl or cyclohexyl group.

The methyl, ethyl, β-hydroxyethyl or β-sulphoethyl radical may be mentioned as examples of lower alkyl substituents $R_1$.

The radical of the azo component A can contain the substituents which are usual for dyestuffs, such as sulphonic acid, carboxylic acid, optionally substituted sulphonamide, sulphone, alkylamino, aralkylamino, arylamino, acylamino, nitro, nitrile, hydroxyl, alkoxy or azo groups, halogen atoms such as fluorine, chlorine and bromine, and the like.

By reactive groups Z there are understood those groups, containing one or more reactive groups or removable substituents, which on application of the dyestuffs to cellulose materials in the presence of acid-binding reagents, and optionally under the influence of heat, are able to react with the hydroxyl groups of the cellulose or which, on application to polyamide fibres, such as wool, are able to react with the NH groups of these fibres, with the formation of covalent bonds. Such fibre-reactive groupings are known in large numbers from the literature.

Reactive groups which are suitable in accordance with the invention and which contain at least one removable substituent bonded to a heterocyclic or to an aliphatic radical are, amongst others, those which contain at least one reactive substituent bonded to a 5-membered or 6-membered heterocyclic ring, such as to a monazine, diazine, triazine, for example pyridine, pyrimidine, pyridazine, pyrazine, thiazine, oxazine or asymmetrical or symmetrical triazine ring, or to a ring system which possesses one or more fused aromatic rings, such as a quinoline, phthalazine, cinnoline, quinazoline, quinoxaline, acridine, phenazine and phenanthridine ring system; the 5-membered or 6-membered heterocyclic rings which possess at least one reactive substituent are, accordingly, preferably those which contain one or more nitrogen atoms and can contain 5-membered or preferably 6-membered fused carbocyclic rings. Amongst the reactive substituents on the heterocyclic structure, there should for example be mentioned halogen (Cl, Br or F), ammonium, including hydrazinium, sulphonium, sulphonyl, azido-($N_3$), thiocyanato, thio, thioether, oxyether, sulphinic acid and sulphonic acid. Individually, the following should for example be mentioned: monohalogeno- or dihalogeno-symmetrical-triazinyl radicals, for example 2,4-dichlorotriazinyl-6, 2-amino-4-chlorotriazinyl-6, 2-alkylamino-4-chlorotriazinyl-6, such as 2-methylamino-4-chlorotriazinyl-6, 2-ethylamino- or 2-propylamino-4-chlorotriazinyl-6, 2-β-hydroxyethylamino-4-chlorotriazinyl-6, 2-di-β-hydroxyethylamino-4-chlorotriazinyl-6 and the corresponding sulphuric acid half-esters, 2-diethylamino-4-chlorotriazinyl-6, 2-morpholino- or 2-piperidino-4-chlorotriazinyl-6, 2-cyclohexylamino-4-chlorotriazinyl-6, 2-arylamino- and substituted arylamino-4-chlorotriazinyl-6, such as 2-phenylamino-4-chlorotriazinyl-6, 2-(o-, m- or p-carboxy or sulphophenyl)-amino-4-chlorotriazinyl-6, 2-alkoxy-4-chlorotriazinyl-6 such as 2-methoxy- or ethoxy-4-chlorotriazinyl-6, 2-(phenylsulphonylmethoxy)-4-chlorotriazinyl-6, 2-aryloxy- and substituted aryloxy-4-chlorotriazinyl-6, such as 2-phenoxy-4-chlorotriazinyl-6, 2-(p-sulphophenyl)-oxy-4-chlorotriazinyl-6, 2-(o-, m- or p-methyl or methoxyphenyl)-oxy-4-chlorotriazinyl-6, 2-alkylmercapto- or 2-arylmercapto- or 2-(substituted aryl)-mercapto-4-chlorotriazinyl-6, such as 2-β-hydroxyethyl)-mercapto-4-chlorotriazinyl-6, 2-phenylmercapto-4-chlorotriazinyl-6, 2-(4'-methylphenyl)-mercapto-4-chlorotriazinyl-6, 2-(2',4'-dinitro)-phenylmercapto-4-chlorotriazinyl-6, 2-methyl-4-chlorotriazinyl-6, 2-phenyl-4-chlorotriazinyl-6, mono-, di- or tri-halogenopyrimidinyl radicals such as 2,4-dichloropyrimidinyl-6, 2,4,5-trichloropyrimidinyl-6, 2,4-dichloro-5-nitro- or 5-methyl- or -5-carboxymethyl- or -5-carboxy- or -5-cyano- or -5-vinyl- or -5-sulpho- or -5-mono, -di- or -tri-chloromethyl- or -5-carbalkoxy-pyrimidinyl-6, 2,6-dichloropyrimidine-4-carbonyl, 2,4-dichloropyrimidine-5-carbonyl, 2-chloro-4-methyl-pyrimidine-5-carbonyl, 2-methyl-4-chloropyrimidine-5-carbonyl, 2-methylthio-4-fluoropyrimidine-5-carbonyl, 6-methyl-2,4-dichloropyrimidine-5-carbonyl, 2,4,6-trichloropyrimidine-5-carbonyl, 2,4-dichloropyrimidine-5-sulphonyl, 2-chloroquinoxaline-3-carbonyl, 2- or 3-monochloroquinoxaline-6-carbonyl, 2- or 3-mono-chloroquinoxaline-6-sulphonyl, 2,3-dichloroquinoxaline-6-carbonyl, 2,3-dichloroquinoxaline-6-sulphonyl, 1,4-dichlorophthalazine-6-sulphonyl or -6-carbonyl, 2,4-dichloroquinazoline-7- or -6-sulphonyl or -carbonyl, 2- or 3- or 4-(4',5'-dichloropyridazon-6'-yl-1')-phenyl-sulphonyl or -carbonyl, β-(4',5'-dichloropyridazon-6'-yl-1')-ethylcarbonyl, N-methyl-N-(2,4-dichlorotriazinyl-6)-carbamyl, N-methyl-N-(2-methylamino-4-chlorotriazinyl-6)-carbamyl, N-methyl-N-(2-dimethylamino-4-chlorotriazinyl-6)-carbamyl, N-methyl- or N-ethyl-N-(2,4-dichlorotriazinyl-6)-aminoacetyl, N-methyl-N-(2,3-dichloroquinoxaline-6-sulphonyl)-aminoacetyl, N-methyl-N-(2,3-dichloroquinoxaline-6-carbonyl)-aminoacetyl, as well as the corresponding bromine and fluorine derivatives of the above-mentioned chlorine-substituted heterocyclic radicals, including for example 2-fluoro-4-pyrimidinyl, 2,6-difluoro-4-pyrimidinyl, 2,6-difluoro-5-chloro-4-pyrimidinyl, 2-fluoro-5,6-dichloro-4-pyrimidinyl, 2,6-difluoro-5-methyl-4-pyrimidinyl, 2,5-difluoro-6-methyl-4-pyrimidinyl, 2-fluoro-5-methyl-6-chloro-4-pyrimidinyl, 2-fluoro-5-nitro-6-chloro-4-pyrimidinyl, 5-bromo-2-fluoro-4-pyrimidinyl, 2-fluoro-5-cyano-4-pyrimidinyl, 2-fluoro-5-methyl-4-pyrimidinyl, 2,5,6-trifluoro-4- pyrimidinyl, 5-chloro-6-chloromethyl-2-fluoro-4-pyrimidinyl, 2,6-difluoro-5-bromo-4-pyrimidinyl, 2-fluoro-5-bromo-6-methyl-4-pyrimidinyl, 2-fluoro-5-bromo-6-chloromethyl-4-pyrimidinyl, 2,6-difluoro-5-chloromethyl-4-pyrimidinyl, 2,6-difluoro-5-nitro-4-pyrimidinyl, 2-fluoro-6-methyl-4-pyrimidinyl, 2-fluoro-5-chloro-6-methyl-4-pyrimidinyl, 2-fluoro-5-chloro-4-pyrimidinyl, 2-fluoro-6-chloro-4-pyrimidinyl, 6-trifluoromethyl-5-chloro-2-fluoro-4-pyrimidinyl, 6-trifluoromethyl-2-fluoro-4-pyrimidinyl, 2-fluoro-5-nitro-4-pyrimidinyl, 2-fluoro-5-trifluoromethyl-4-pyrimidinyl, 2-fluoro-5-phenyl- or -5-methyl-sulphonyl-4-pyrimidinyl, 2-fluoro-5-carbonamido-4-pyrimidinyl, 2-fluoro-5-carbomethoxy-4-pyrimidinyl, 2-fluoro-5-bromo-6-trifluoromethyl-4-pyrimidinyl, 2-fluoro-6-carbonamido-4-pyrimidinyl, 2-fluoro-6-carbomethoxy-4-pyrimidinyl, 2-fluoro-6-phenyl-4-pyrimidinyl, 2-fluoro-6-cyano-4-pyrimidinyl, 2,6-difluoro-5-methylsulphonyl-4-pyrimidinyl, 2-fluoro-5-sulphonamido-4-pyrimidinyl, 2-fluoro-5-chloro-6-carbomethoxy-4-pyrimidinyl, 2,6-difluoro-5-trifluoromethyl-4-pyrimidinyl; triazine radicals containing sulphonyl groups, such as 2,4-bis-(phenylsulphonyl)-triazinyl-6, 2-(3'-carboxyphenyl)-sulphonyl-4-chlorotriazinyl-6, 2-(3'-sulphophenyl)-sulphonyl-4-chlorotriazinyl-6, 2,4-bis-(3'-carboxy-phenylsulphonyl-1')-triazinyl-6; pyrimidine rings containing sulphonyl groups, such as 2-carboxymethylsulphonyl-pyrimidinyl-4, 2-methylsulphonyl-6-methylpyrimidinyl-4, 2-methyl-sulphonyl-6-ethyl-pyrimidinyl-4, 2-phenylsulphonyl-5-chloro-6-methyl-pyrimidinyl-4, 2,6-bis-methylsulphonyl-pyrimidinyl-4, 2,6-bis-methylsulphonyl-5-chloropyrimidinyl-4, 2,4-bis-methylsulphonyl-pyrimidine-5-sulphonyl, 2-methylsulphonyl-pyrimidinyl-4, 2-phenylsulphonyl-pyrimidinyl-4, 2-trichloromethylsulphonyl-6-methyl-pyrimidinyl-4, 2-methylsulphonyl-5-chloro-6-methyl-pyrimidinyl-4, 2-methylsulphonyl-5-bromo-6-methyl-pyrimidinyl-4, 2-methylsulphonyl-5-chlor-6-ethylpyrimidinyl-4, 2-methylsulphonyl-5-chloro-6-chloromethylpyrimidinyl-4, 2-methylsulphonyl-4-chloro-6-methyl-pyrimidine-5-sulphonyl, 2-methylsulphonyl-5-nitro-6-methyl-pyrimidinyl-4, 2,5,6-tris-methylsulphonyl-pyrimidinyl-4, 2-methylsulphonyl-5,6-dimethyl-pyrimidinyl-4, 2-ethylsulphonyl-5-chloro-6-methylpyrimidinyl-4, 2-methylsulphonyl-6-chloro-pyrimidinyl-4, 2,6-bis-methylsulphonyl-5-chloro-pyrimidinyl-4, 2-methylsulphonyl-6-carboxy-pyrimidinyl-4, 2-methylsulphonyl-5-sulpho-pyrimidinyl-4, 2-methylsulphonyl-6-carbomethoxy-pyrimidinyl-4, 2-methylsulphonyl-5-carboxy-pyrimidinyl-4, 2-methylsulphonyl-5-cyano-6-methoxy-pyrimidinyl-4, 2-methylsulphonyl-5-chloro-pyrimidinyl-4, 2-sulphoethyl-sulphonyl-6-methyl-pyrimidinyl-4, 2-methylsulphonyl-5-bromo-pyrimidinyl-4, 2-phenylsulphonyl-5-chloro-pyrimidinyl-4, 2-carboxymethylsulphonyl-5-chloro-6-methyl-pyrimidinyl-4, 2-methylsulphonyl-6-chloro-pyrimidine-4- and -5-carbonyl, 2,6-bis-(methylsulphonyl)-pyrimidine-4- or -5-carbonyl, 2-ethylsulphonyl-6-chloro-pyrimidine-5-carbonyl, 2,4-bis-(methylsulphonyl)-pyrimidine-5-sulphonyl, 2-methylsulphonyl-4-chloro-6-methyl-pyrimidine-5-sulphonyl or -carbonyl; triazine rings containing ammonium groups, such as 2-trimethylammonium-4-phenylamino- or -4-(o-, m- or p-sulphophenyl)-aminotriazinyl-6, 2-(1,1-dimethylhydrazinium)-4-phenylamino- or -4-(o-, m- or p-sulphophenyl)-amino-triazinyl-6, 2-(2-isopropylidene-1,1-dimethyl)-hydrazinium-4-phenylamino- or -4-(o-, m- or p-sulphophenyl)-aminotriazinyl-6, 2-N-aminopyrrolidinium- or 2-N-aminopiperidinium-4-phenylamino- or -4-(o-, m- or p-sulphophenyl)-aminotriazinyl-6, and also 4-phenylamino- or 4-(sulphophenylamino)-triazinyl-6 residues which in the 2-position contain 1,4-bis-azabicyclo-[2,2,2]-octane or 1,2-bis-azabicyclo-[0,3,3]-octane bonded via a nitrogen bond to give a quaternary structure, 2-pyridinium-4-phenylamino- or -4-(o-, m- or p-sulphophenyl)-aminotriazinyl-6 as well as corresponding 2-oniumtriazinyl-6 residues, which are substituted in the 4-position by alkylamino groups, such as methylamino, ethylamino or β-hydroxyethylamino groups, or alkoxy groups, such as methoxy or alkoxy, or aroxy groups such as phenoxy or sulphophenoxy groups; 2-chlorobenzthiazole-5- or -6-carbonyl or -5- or -6-sulphonyl, 2-arylsulphonyl- or 2-alkylsulphonyl-benzthiazole-5- or -6-carbonyl or -5- or -6-sulphonyl, such as 2-methylsulphonyl- or 2-ethylsulphonyl-benzthiazole-5- or -6-sulphonyl or -carbonyl, 2-phenylsulphonylbenzthiazole-5- or -6-sulphonyl or -carbonyl and the corresponding 2-sulphonylbenzthiazole-5- or -6-carbonyl or -sulphonyl derivatives containing sulpho groups in the fused benzene ring, 2-chlorobenzoxazole-5- or -6-carbonyl or -sulphonyl, 2-chlorobenzimidazole-5- or -6-carbonyl or -sulphonyl, 2-chloro-1-methylbenzimidazole-5- or -6-carbonyl or -sulphonyl, 2-chloro-4-methylthiazole-(1,3)-5-carbonyl or -4- or -5-sulphonyl, and the N-oxide of 4-chloro- or 4-nitro-quinoline-5-carbonyl.

Furthermore reactive groups of the aliphatic series should be mentioned, such as acryloyl, mono-, di- or tri-chloracryloyl, such as —CO—CH=CH—Cl, —CO—CCl=CH₂, —CO—CCl=CH—CH₃, and also —CO—CCl=CH—COOH, —CO—CH=C-Cl—COOH, β-chloropropionyl, 3-phenylsulphonylpropionyl, 3-methylsulphonylpropionyl, 3-phenylsulphonylpropionyl, β-sulphato-ethylaminosulphonyl, vinylsulphonyl, β-chlorethylsulphonyl, β-sulphato-ethylsulphonyl, β-methylsulphonyl-ethylsulphonyl, β-phenylsulphonylethylsulphonyl, 2-fluoro-2-chloro-3,3-difluorocyclobutane-1-carbonyl, 2,2,3,3-tetrafluorocyclobutane-carbonyl-1 or -sulphonyl-1, β-(2,2,3,3-tetrafluorocyclobutyl-1)-acryloyl, α- or β-bromacryloyl, and α- or β-alkyl- or -arylsulphonylacryloyl groups, such as α- or β-methylsulphonylacryloyl.

Compounds which are preferred within the framework of the new dyestuffs correspond to the following formulae:

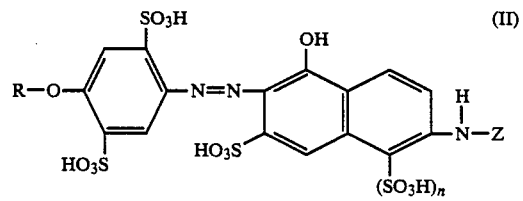

(II)

wherein R and Z have the above-mentioned significance and n represents 0 or 1;

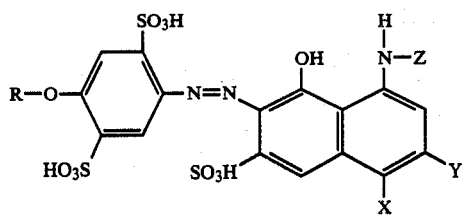

(III)

wherein R and Z have the above-mentioned significance and X and Y either represent hydrogen or represent a sulphonic acid group, but X and Y must not simultaneously have the same significance;

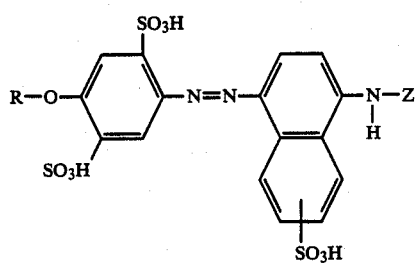

(IV)

wherein R and Z have the above-mentioned significance;

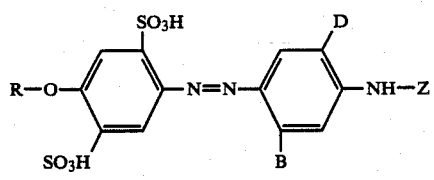

(V)

wherein R and Z have the above-mentioned significance, B represents hydrogen or an acylamino group and D represents hydrogen or a lower alkyl or alkoxy group;

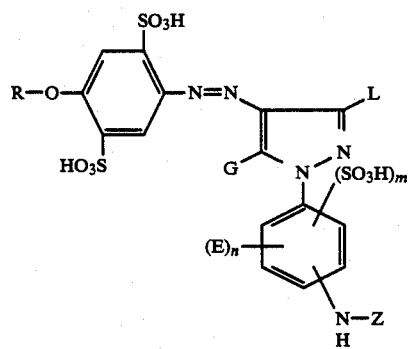

(VI)

wherein R and Z have the above-mentioned significance, G represents an OH or $NH_2$ group, L represents a methyl, carboxyl or carbonamide group, E represents hydrogen, a methyl group or a halogen atom, m denotes 0 or 1 and n denotes the number 1 or 2.

The dyestuffs according to the invention can be manufactured by converting the grouping $$-\underset{R_1}{\overset{|}{N}}-H,$$

in dyestuffs of general formula

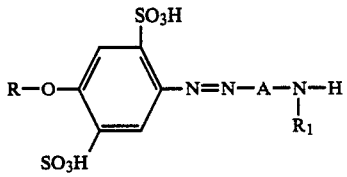

(VII)

wherein R, A and $R_1$ have the above-mentioned significance, by condensation with a reactive component of general formula

X—Z    (VIII)

wherein Z has the above-mentioned significance and X represents a removable substituent, into a grouping $$-\underset{R_1}{\overset{|}{N}}-Z.$$

Reactive components of formula (VIII) which are suitable for this purpose are for example those on which the above-mentioned reactive groups Z are based, that is to say generally the halides, especially the chlorides, of the acyl components Z which have been mentioned. Amongst the large number of available compounds, the following may here be mentioned as a selection: trihalogeno-symmetrical triazines, such as cyanuryl chloride and cyanuryl bromide, dihalogeno-monoamino- and mono-substituted-amino-symmetrical triazines, such as 2,6-dichloro-4-aminotriazine, 2,6-dichloro-4-methylaminotriazine, 2,6-dichloro-4-ethylaminotriazine, 2,6-dichloro-4-hydroxyethylaminotriazine, 2,6-dichloro-4-phenylaminotriazine, 2,6-dichloro-4-(o- , m- or p-sulphophenyl)-aminotriazine, 2,6-dichloro-4-(2',3'-, -2',4'-, -3',4'- or -3',5'-disulphophenyl)-aminotriazine, dihalogenalkoxy- and -aryloxy-sym.-triazines, such as 2,6-dichloro-4-methoxytriazine, 2,6-dichloro-4-ethoxytriazine, 2,6-dichloro-4-phenoxytriazine, 2,6-dichloro-4-(o-, m- or p-sulphophenyl)-oxytriazine, dihalogen-alkylmercapto- and -arylmercapto-sym.-triazines, such as 2,6-dichlor-4-ethylmercaptotriazine, 2,6-dichloro-4-phenylmercaptotriazine, 2,6-dichloro-4-(p-methylphenyl)-mercaptotriazine; tetrahalogenopyrimidines such as tetrachloro-, tetrabromo-, or tetrafluoro-pyrimidine, 2,4,6-trihalogenopyrimidines such as 2,4,6-trichloro-, 2,4,6-tribromo- or 2,4,6-trifluoro-pyrimidine, dihalogenopyrimidines such as 2,4-dichloro-, 2,4-dibromo- or 2,4-difluoro-pyrimidine; 2,4,6-trichloro-5-nitro- or -5-methyl- or -5-carbomethoxy- or -5-carbethoxy- or -5-carboxymethyl- or -5-mono, -di- or -trichloromethyl- or -5-carboxy- or -5-sulpho- or -5-cyano- or -5-vinyl-pyrimidine, 2,4-difluoro-6-methyl-pyrimidine, 2,6-difluoro-4-methyl-5-chloropyrimidine, 2,4-difluoro-pyrimidine-5-ethylsulphone, 2,6-difluoro-4-chloropyrimidine, 2,4,6-trifluoro-5-chloropyrimidine, 2,6-difluoro-4-methyl-5-bromopyrimidine, 2,4-difluoro-5,6-dichloro- or -dibromopyrimidine, 4,6-difluoro-2,5-dichloro- or -dibromopyrimidine, 2,6-difluoro-4- bromopyrimidine, 2,4,6-trifluoro-5-bromopyrimidine, 2,4,6-trifluoro-5-chloromethylpyrimidine, 2,4,6-trifluoro-5-nitropyrimidine, 2,4,6-trifluoro-5-cyanopyrimidine, 2,4,6-trifluoropyrimidine-5-carboxylic acid alkyl ester or -5-carboxylic acid amides, 2,6-difluoro-5-methyl-4-chloropyrimidine, 2,6-difluoro-5-chloropyrimidine, 2,4,6-trifluoro-5-methylpyrimidine, 2,4,5-trifluoro-6-methylpyrimidine, 2,4-difluoro-5-nitro-6-chloropyrimidine, 2,4-difluoro-5-cyanopyrimidine, 2,4-difluoro-5-methylpyrimidine, 6-trifluoromethyl-5-chloro-2,4-difluoropyrimidine, 6-phenyl-2,4-difluoropyrimidine, 6-trifluoromethyl-2,4-difluoropyrimidine, 5-trifluoromethyl-2,4,6-trifluoropyrimidine, 2,4-difluoro-5-nitropyrimidine, 2,4-difluoro-5-trifluoromethylpyrimidine, 2,4-difluoro-5-methylsulphonyl-4-pyrimidine, 2,4-difluoro-5-phenylpyrimidine, 2,4-difluoro-5-carbonamidopyrimidine, 2,4-difluoro-5-carbomethoxypyrimidine, 2,4-difluoro-6-trifluoromethylpyrimidine, 2,4-difluoro-5-bromo-6-trifluoromethylpyrimidine, 2,4-difluoro-6-carbonamidopyrimidine, 2,4-difluoro-6-carbomethoxypyrimidine, 2,4-difluoro-6-phenylpyrimidine, 2,4-difluoro-6-cyanopyrimidine, 2,4,6-trifluoro-5-methylsulphonylpyrimidine, 2,4-difluoro-5-sulphonamidopyrimidine, 2,4-difluoro-5-chloro-6-carbomethoxypyrimidine, 5-trifluoromethyl-2,4-difluoropyrimidine, 2,4-dichloropyrimidine-5-carboxylic acid chloride, 2,4,6-trichloropyrimidine-5-carboxylic acid chloride, 2-methyl-4-chloropyrimidine-5-carboxylic acid chloride, 2-chloro-4-methylpyrimidine-5-carboxylic acid chloride, 2,6-dichloropyrimidine-4-carboxylic acid chloride; pyrimidine reactive components with removable sulphonyl groups, such as 2-carboxymethylsulphonyl-4-chloropyrimidine, 2-methylsulphonyl-4-chloro-6-methylpyrimidine, 2,4-bis-methylsulphonyl-6-methylpyrimidine, 2,4-bis-phenylsulphonyl-5-chloro-6-methylpyrimidine, 2,4,6-trismethylsulphonylpyrimidine, 2,6-bis-methylsulphonyl-4,5-dichloropyrimidine, 2,4-bis-methylsulphonylpyrimidine-5-sulphonic acid chloride, 2-methylsulphonyl-4-chloropyrimidine, 2-phenylsulphonyl-4-chloropyrimidine, 2,4-bis-trichloromethylsulphonyl-6-methylpyrimidine, 2,4-bis-methylsulphonyl-5-chloro-6-methylpyrimidine, 2,4-bis-methylsulphonyl-5-bromo-6-methylpyrimidine, 2-methylsulphonyl-4,5-dichloro-6-methylpyrimidine, 2-methylsulphonyl-4,5-dichloro-6-chloromethylpyrimidine, 2-methylsulphonyl-4-chloro-6-methylpyrimidine-5-sulphonic acid chloride, 2-methylsulphonyl-4-chloro-5-nitro-6-methylpyrimidine, 2,4,5,6-tetramethylsulphonylpyrimidine, 2-methylsulphonyl-4-chloro-5,6-dimethylpyrimidine, 2-ethylsulphonyl-4,5-dichloro-6-methylpyrimidine, 2-methylsulphonyl-4,6-dichloropyrimidine, 2,4,6-tris-methylsulphonyl-5-chloropyrimidine, 2-methylsulphonyl-4-chloro-6-carboxypyrimidine, 2-methylsulphonyl-4-chloropyrimidine-5-sulphonic acid, 2-methylsulphonyl-4-chloro-6-carbomethoxypyrimidine, 2-methylsulphonyl-4-chloropyrimidine-5-carboxylic acid, 2-methylsulphonyl-4-chloro-5-cyano-6-methoxypyrimidine, 2-methylsulphonyl-4,5-dichloropyrimidine, 4,6-bis-methylsulphonylpyrimidine, 4-methylsulphonyl-6-chloropyrimidine, 2-sulphoethylsulphonyl-4-chloro-6-methylpyrimidine, 2-methylsulphonyl-4-chloro-5-bromopyrimidine, 2-methylsulphonyl-4-chloro-5-bromo-6-methylpyrimidine, 2,4-bismethylsulphonyl-5-chloropyrimidine, 2-phenylsulphonyl-4,5-dichloropyrimidine, 2-phenylsulphonyl-4,5-dichloro-6-methylpyrimidine, 2-carboxymethylsulphonyl-4,5-dichloro-6-methylpyrimidine, 2-(2'- or 3'- or 4'-carboxyphenylsulphonyl)-4,5-dichloro-6-methylpyrimidine, 2,4-bis-(2'- or 3'- or 4'-carboxyphenylsulphonyl)-5-chloro-6-methylpyrimidine, 2-methylsulphonyl-6-chloropyrimidine-4- or -5-carboxylic acid chloride, 2-ethylsulphonyl-6-chloropyrimidine-4- or -5-carboxylic acid chloride, 2,6-bis-(methylsulphonyl)-pyrimidine-4-carboxylic acid chloride, 2-methylsulphonyl-6-methyl-4-chloro- or -4-bromopyrimidine-5-carboxylic acid chloride or bromide, 2,6-bis-(methylsulphonyl)-4-chloropyrimidine-5-carboxylic acid chloride; further reactive components of the heterocyclic series having reactive sulphonyl substituents are for example 3,6-bis-phenylsulphonyl-pyridazine, 3-methylsulphonyl-6-chloropyridazine, 3,6-bis-trichloromethylsulphonyl-pyridazine, 3,6-bis-methylsulphonyl-4-methylpyridazine, 2,5,6-tris-methylsulphonylpyrazine, 2,4-bis-methylsulphonyl-1,3,5-triazine, 2,4-bis-methylsulphonyl-6-(3'-sulphophenylamino)-1,3,5-triazine, 2,4-bis-methylsulphonyl-6-N-methylanilino-1,3,5-triazine, 2,4-bis-methylsulphonyl-6-phenoxy-1,3,5-triazine, 2,4-bis-methylsulphonyl-6-trichloroethoxy-1,3,5-triazine, 2,4,6-trisphenylsulphonyl-1,3,5-triazine, 2,4-bis-methylsulphonylquinazoline, 2,4-bis-trichloromethylsulphonylquinoline, 2,4-bis-carboxymethylsulphonylquinoline, 2,6-bis-(methylsulphonyl)-pyridine-4-carboxylic acid chloride and 1-(4'-chlorocarbonylphenyl- or 2'-chlorocarbonylethyl)-4,5-bis-methylsulphonylpyridazone-(6); further heterocyclic reactive components with mobile halogen are, amongst others, 2- or 3-monochloroquinoxaline-6-carboxylic acid chloride or -6-sulphonic acid chloride, 2- or 3-monobromoquinoxaline-6-carboxylic acid bromide or -6-sulphonic acid bromide, 2,3-dichloroquinoxaline-6-carboxylic acid chloride or -6-sulphonic acid chloride, 2,3-dibromoquinoxaline-6-carboxylic acid bromide or -6-sulphonic acid bromide, 1,4-dichlorophthalazine-6-carboxylic acid chloride or -6-sulphonic acid chloride as well as the corresponding bromine compounds, 2,4-dichloroquinazoline-6- or -7-carboxylic acid chloride or -sulphonic acid chloride as well as the corresponding bromine compounds, 2- or 3- or 4-(4',5'-dichloropyridazone-6'-yl-1')-phenylsulphonic acid chloride or -carboxylic acid chloride as well as the corresponding bromine compounds, β-(4',5'-dichloropyridazon-6'-yl-1')-ethylcarboxylic acid chloride, 2-chloroquinoxaline-3-carboxylic acid chloride and the corresponding bromine compound, N-methyl-N-(2,4-dichlorotriazinyl-6)-carbamic acid chloride, N-methyl-N-(2-chloro-4-methylamino-triazinyl-6)-carbamic acid chloride, N-methyl-N-(2-chloro-4-dimethylamino-triazinyl-6)-carbamic acid chloride, N-methyl- or N-ethyl-N-(2,4-dichlorotriazinyl-6)-aminoacetyl chloride, N-methyl-, N-ethyl- or N-hydroxyethyl-N-(2,3-dichloroquinoxaline-6-sulphonyl or -6-carbonyl)-aminoacetyl chloride and the corresponding bromine derivatives, and also 2-chlorobenzthiazole-5- or -6-carboxylic acid chloride or -5- or -6-sulphonic acid chloride and the corresponding bromine compounds, 2-arylsulphonyl- or 2-alkylsulphonyl-benzthiazole-5- or -6-carboxylic acid chloride or -5- or -6-sulphonic acid chloride, such as 2-methylsulphonyl- or 2-ethylsulphonyl- or 2-phenylsulphonylbenzthiazole-5- or -6-sulphonic acid chloride or -5- or -6-carboxylic acid chloride as well as the corresponding 2-sulphonylbenzthiazole derivatives containing sulphonic acid groups in the fused benzene ring, 3,5-bis-methylsulphonyl-isothiazole-4-carboxylic acid chloride, 2-chlorobenzoxazole-5- or -6-carboxylic acid chloride or -sulphonic acid chloride as well as the corresponding bromine derivatives, 2-chlorobenzimidazole-5- or -6-carboxylic acid chloride or -sulphonic acid chloride as well as the corresponding bromine derivatives, 2-chloro-1-methyl-benzimidazole-5- or -6-carboxylic acid chloride or -sulphonic acid chloride as well as the corresponding bromine derivatives, 2-chloro-4-methylthiazole-(1,3)-5-carboxylic acid chloride or -4- or -5-sulphonic acid chlorhde, 2-chlorothiazole-4- or -5-sulphonic acid chloride and the corresponding bromine derivatives.

Amongst the series of the aliphatic reactive components there should for example be mentioned: acrylic acid chloride, mono-, di- or tri-chloracrylic acid chloride, 3-chloropropionic acid chloride, 3-phenylsulphonyl-propionic acid chloride, 3-methylsulphonyl-propionic acid chloride, 3-ethylsulphonyl-propionic acid chloride, 3-chlorethane-sulphochloride, chloromethanesulphochloride, 2-chloracetyl chloride, 2,2,3,3-tetrafluorocyclobutane-1-carboxylic acid chloride, $\beta$-(2,2,3,3-tetrafluorocyclobutyl-1)-acrylic acid chloride, $\beta$-(2,3,3-trifluoro-2-chlorocyclobutane-1)-carboxylic acid chloride, $\beta$-methylsulphonylacrylic acid chloride, $\alpha$-methylsulphonyl-acrylic acid chloride and $\alpha$-bromacrylic acid chloride and $\beta$-bromacrylic acid chloride.

If the conversion leads to dyestuffs which possess more than one reactive group in the radical Z or at another point of the dyestuff molecule, then these can in part be replaced by other radicals, for example amino radicals, which in turn may possess reactive groups, for example in the form of esterified hydroxyalkyl groups. Fundamentally, it is possible for two or more reactive groups which are different from one another to be present in the dyestuff.

These condensation reactions are in general carried out in an aqueous or organic medium and in the alkaline, neutral or weakly acid range.

The dyestuffs of general formula (VII) serving as the starting material for this process can be manufactured by coupling diazotised amines of general formula

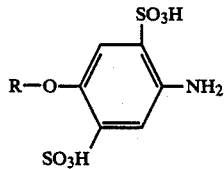 (IX)

wherein R has the above-mentioned significance, with the azo components in a medium which is acidified with a mineral acid or acetic acid, neutral, or rendered alkaline with sodium bicarbonate, sodium carbonate or sodium hydroxide, depending on the nature of the azo components employed.

The grouping

wherein $R_1$ has the above-mentioned significance, which is required for the condensation with the reactive component X-Z, wherein X and Z have the above-mentioned significance, can already be present as such in the azo component or can only be produced after coupling has taken place, by saponification of an acetylated amino group or by reduction of a nitro group.

Possible azo components on which the radical A is based are preferably those of the series of the aminobenzenes, amino-hydroxy-benzenes, aminonaphthalenes, amino-hydroxy-naphthalenes, pyrazolones, aminopyrazoles and acetoacetic acid amides. Amongst the large number of azo components which should here be mentioned, the following may be mentioned as a selection: aniline, 1-amino-3-methyl-benzene, 1-amino-3-methyl-6-methoxybenzene, 1-amino-3-sulphoacetylamino-benzene, 1-amino-3-sulphatoacetylamino-benzene, 1-amino-3-acetylamino-benzene, 1-amino-3-acetylamino-6-methoxy-benzene, 1-amino-2,5-dimethoxy-benzene, 1-hydroxy-4-acetylamino-benzene, 1-amino-naphthalene-6,7- or -8-sulphonic acid; 1-hydroxy-8-acetamino-naphthalene-3,6-disulphonic acid, 1-hydroxy-8-acetamino-naphthalene-3,5-disulphonic acid, 1-hydroxy-8-benzoylamino-naphthalene-3,5-disulphonic acid, 1-hydroxy-8-benzoylamino-naphthalene-3,6-disulphonic acid, 1-hydroxy-8-amino-naphthalene-3,6-disulphonic acid, 1-hydroxy-8-amino-naphthalene-3,5-disulphonic acid, 1-hydroxy-6-acetaminonaphthalene-3-sulphonic acid, 1-hydroxy-6-amino-naphthalene-3-sulphonic acid, 1-hydroxy-7-acetamino-naphthalene-3-sulphonic acid, 1-hydroxy-7-amino-naphthalene-3-sulphonic acid, 1-hydroxy-7-amino-naphthalene-3,6-disulphonic acid, 1-hydroxy-6-amino-naphthalene-3,5-disulphonic acid, 2-(2'-aminoethyl)-amino-naphthalene-7-sulphonic acid, 2-(2'-aminoethyl)-amino-naphthalene-6-sulphonic acid, 2-(2'-aminoethyl)-amino-8-hydroxy-naphthalene-6-sulphonic acid, 2-(2'-aminoethyl)-amino-5-hydroxy-naphthalene-7-sulphonic acid, 2-(4'-aminophenyl)-amino-5-hydroxy-naphthalene-7-sulphonic acid, 1-hydroxy-8-(4-amino-benzoylamino)-naphthalene-3,6-disulphonic acid, 1-amino-8-hydroxy-naphthalene-4-sulphonic acid, 1-amino-8-hydroxy-naphthalene-6-sulphonic acid, 1-hydroxy-5-amino-naphthalene-3-sulphonic acid, 1-amino2-ethoxy-naphthalene-6-sulphonic acid, 1-amino-3-acetaminobenzene-6-sulphonic acid, 1,3-diamino-benzene, 1-amino-2-methoxy-benzene, 2-hydroxy-7-amino-naphthalene, 1-hydroxy-6-amino-naphthalene, 6-nitro-2-hydroxy-naphthalene-4-sulphonic acid, 1-(3'-aminophenyl)-pyrazolone-5-carboxylic acid-(3), 1-(2'-methyl-3'-amino-5'-sulphophenyl)-3-methyl-pyrazolone-(5), 1-(3'-aminophenyl)-3-methyl-pyrazolone-(5), 1-(4'-aminophenyl)-3-methyl-pyrazolone-(5), 1-(3'-aminophenyl)-3-methyl-5-amino-pyrazole, 1-(2'-aminoethyl)-aminonaphthalene-8-sulphonic acid, 1-(2'-sulpho-4'-$\omega$-methylamino-methyl-phenyl)-3-methyl-pyrazolone-(5), 1-(4'-$\omega$-methylamino-methyl-phenyl)-3-methyl-pyrazolone-(5), 1-(3'-sulpho-4'-$\omega$-methylamino-methyl-phenyl)-3-methyl-pyrazolone-(5), acetoacetic acid-4-aminoanilide, and acetoacetic acid-4-amino-2,5-dimethoxyanilide.

The amines of formula (IX) employed as diazo components are manufactured by sulphonation of the 1-amino-4-alkoxy-benzene-2-sulphonic acids, whereupon, in addition to the 1-amino-4-alkoxy-benzene-2,5-disulphonic acids, the isomeric 2,3- and 2,6-disulphonic acids are also formed to a lesser extent, but do not have to be separated off. The by-products, 1-amino-4-alkoxybenzene-2,3- and -2,6-disulphonic acid, yield correspondingly small proportions of azo dyestuffs in which the sulphonic acid groups, instead of being in the 2-position and 5-position of formula (I), are in the 2- and 3-position or 2- and 6-position of the benzene nucleus, respectively.

If the monoazo dyestuffs obtainable with the azo components mentioned still contain diazotisable amino groups, then these can also be diazotised according to a usual process and be reacted again with a suitable coupling component, whereupon disazo dyestuffs are obtained which must contain the grouping

wherein R₁ has the above-mentioned significance.

A compound from the series of the azo components already quoted, on which the radial A is based, can for example serve as the coupling component for the renewed reaction with the diazotised monoazo dyestuff.

A further possibility of synthesising disazo dyestuffs of the nature mentioned consists of manufacturing monoazo dyestuffs which still contain positions capable of coupling, and then combining these with suitable diazo components in a second coupling step, with the 1-amino-4-alkoxy-disulphobenzene diazo components to be used according to the invention being employed for the first or also for the second coupling step. As azo components, which serve for the synthesis of such monoazo dyestuffs, those from the series of the dihydroxybenzenes, dihydroxynaphthalenes and aminohydroxynaphthalenes are above all used. Apart from the components already mentioned, 1,3-dihydroxybenzene and 1,3-dihydroxynaphthalene-5,7-disulphonic acid may further be named as examples. As the second or further diazo component for the synthesis of such disazo dyestuffs, it is possible to use, amongst others: 1-amino-3-acetamino-6-sulphobenzene, 1-amino-4-acetamino-6-sulphobenzene, 1-amino-4-nitro-6-sulpho-benzene and 2-amino-6-nitro-naphthalene-4,8-disulphonic acid.

According to another procedure, the new dyestuffs of general formula (I) can also be manufacture by combining diazotised amines of general formula (IX) with azo components

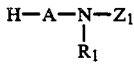

wherein A, R₁ and Z have the above-mentioned significance.

Possible coupling components for this process variant are compounds which couple in the o-position or p-position to an optionally substituted amino group or in the adjacent position to a phenolic or enolic hydroxyl group. As examples of such coupling components, there may be mentioned: 1-hydroxy-6-(2',4'-dichlorotriazinyl-6')-amino-naphthalene-3-sulphonic acid, 1-hydroxy-6-(2',4',5'-trichloropyrimidinyl-6')-amino-naphthalene-3-sulphonic acid, 1-hydroxy-6-(2'-methylsulphonyl-5'-chloro-6'-methyl-pyrimidinyl-4')-amino-naphthalene-3-sulphonic acid, 1-hydroxy-6-(2',6'-difluoro-5'-chloro-pyrimidinyl-4')-amino-naphthalene-3-sulphonic acid, 1-hydroxy-6-(3',5'-bismethylsulphonylisothiazole-4'-carbonyl)-amino-naphthalene-3-sulphonic acid, 1-hydroxy-6-(2',3'-dichloroquinoxaline-6'-carbonyl)-amino-naphthalene-3,5-disulphonic acid, 1-hydroxy-6-(2'-methylsulphonylbenzthiazole-5'- or -6'-carbonyl)-amino-naphthalene-3,5-disulphonic acid, 1-hydroxy-7-(2',4'-dichlorotriazinyl-6')-aminonaphthalene-3-sulphonic acid, 1-hydroxy-7-(2',4',5'-trichloropyrimidinyl-6')-amino-naphthalene-3-sulphonic acid, 1-hydroxy-7-(2'-methylsulphonyl-5'-chloro-6'-methyl-pyrimidinyl-4')-aminonaphthalene-3-sulphonic acid, 1-hydroxy-7-(2',3'-dichloroquinoxaline-6'-carbonyl)-amino-naphthalene-3-sulphonic acid, 1-[3-(2',3'-dichloroquinoxaline-6'-carbonyl)-aminophenyl]-3-carboxypyrazolone-(5), 1-[4'-(2",4",5"-trichloropyrimidinyl-6")-aminophenyl]-3-methyl-pyrazolone-(5), 1-[3'-(2",4"-dichlorotriazinyl-6")-aminophenyl]-3-methyl-pyrazolone-(5), 2-[2'-(2",3"-dichloroquinoxaline-6"-carbonyl)-aminoethyl]-naphthalene-6-sulphonic acid, 2-[2'-(2",3"-dichloroquinoxaline-6"-carbonyl)-aminoethyl]-8-hydroxynaphthalene-6-sulphonic acid, 1-(2',3'-dichloroquinoxaline-6'-carbonyl)-amino-3-amino-4-sulphobenzene, 3-(2'-methylsulphonyl-5'-chloro-6'-methyl-pyrimidinyl-4')-amino-6-sulphobenzene<1 azo 2>-1-amino-8-hydroxynaphthalene-3,6-disulphonic acid, 3-(2',3'-dichloroquinoxaline-6'-carbonyl)-amino-6-sulpho-benzene<1 azo 2>-1-amino-8-hydroxy-naphthalene-3,6-disulphonic acid, Cu-complex of 2,4-dihydroxy-benzene<1 azo 2>-1-hydroxy-4-sulpho-6-(2',3'-dichloroquinoxaline-6'-carbonyl)-aminobenzene.

Dyestuffs according to the invention, of general formula (I), in which the radical A contains an azo group can also be obtained by coupling a diazotised amine of formula (IX) in an acid medium to an azo component which still possesses a further position capable of coupling, and combining the monoazo dyestuff thus obtained, in an alkaline medium, with the diazo compound of an amine which additionally possesses a grouping

wherein R₁ and Z have the significance already mentioned, for example of formula

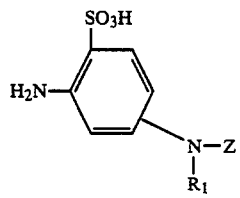

wherein R₁ and Z have the significance already mentioned.

As azo components which are suitable for coupling with the diazotised amines (IX) and (X), those from the series of the dihydroxybenzenes, dihydroxynaphthalenes and aminohydroxynaphthalenes already mentioned may for example be named.

The new dyestuffs are suitable for dyeing and printing materials containing hydroxyl groups or amide groups, such as textile fibres, filaments and fabrics made of wool, silk, synthetic polyamide fibres and polyurethane fibres, and for the wash-fast dyeing and printing of native or regenerated cellulose, the treatment of cellulose materials appropriately being carried out in the presence of acid-binding reagents and optionally by the action of heat, in accordance with the processes which have become known for reactive dyestuffs.

In the examples which follow the parts denote parts by weight. The temperatures are given in degrees Centigrade.

EXAMPLE 1

32.9 parts of 1-hydroxy-6-amino-naphthalene-3,5-disulphonic acid are dissolved in 500 parts of water under neutral conditions; thereafter 30 parts of 2,3-dichloroquinoxaline-6-carboxylic acid chloride are added and the mixture is warmed to 40°–45°. The hydrochloric acid liberated during the condensation is neutralised with dilute sodium carbonate solution. The yellowish green condensation product precipitates in a sparingly soluble form.

28 parts of 1-amino-4-methoxy-benzene-2,5-disulphonic acid are dissolved in 200 parts of ice water under neutral conditions. 28 parts of concentrated hydrochloric acid are added and 24 parts of 30% strength sodium nitrite solution are run in. After brief stirring, the excess amidosulphonic acid is removed.

The diazotised mixture, which has partially precipitated, is run into the suspension of the coupling component, which has been mixed with 28 parts of sodium bicarbonate, at 35°–40°. A dark red solution is obtained which is clarified at 50° and then mixed with 10% by volume of sodium chloride. The precipitated dyestuff is filtered off and dried. A light red dyestuff powder is obtained which is easily soluble in water. In the form of the free sulphonic acid, the dyestuff corresponds to the following composition:

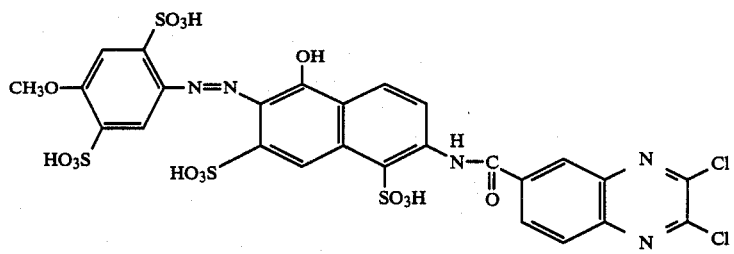

Clear yellowish-tinged scarlet shades are obtained on cellulose-containing material according to one of the application processes which are usual for reactive dyestuffs.

The 1-amino-4-methoxy-benzenedisulphonic acid used in Example 1 can be manufactured in accordance with the following instructions: 70 parts of 1-amino-2-sulpho-4-methoxy-benzene are dissolved in 300 parts of sulphuric acid monohydrate. Thereafter 105 parts of 20% strength oleum are run in. The mixture is warmed for 4 hours to 70° C. in an oil bath, whilst stirring. The cooled solution is poured out onto ice and then sufficient calcium carbonate to produce a neutral solution is added. The calcium sulphate is filtered off and eluted with a copious amount of water. The combined filtrates are adjusted to pH 9–10 with sodium carbonate. The precipitated calcium carbonate is filtered off and the filtrate is concentrated to about 800 parts. This solution contains the sulphonation product, which in the form of the free sulphonic acid corresponds to the following formula:

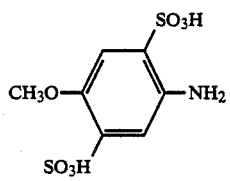

The 1-amino-4-methoxy-benzene-2,3- and -2,6-disulphonic acid formed in small amounts as a by-product does not have to be separated off for the purposes of the further reaction; the dyestuff of Example 1 correspondingly contains small amounts of coupling product from diazotised 1-amino-4-methoxy-benzene-2,3- and -2,6-disulphonic acid.

If the procedure indicated in Example 1 is followed but the coupling components listed in column 1 are employed instead of 1-hydroxy-6-amino-naphthalene-3,5-disulphonic acid and the reactive components listed in column 2 are employed instead of 2,3-dichloroquinoxaline-6-carboxylic acid chloride, valuable reactive dyestuffs are again obtained, the colour shades of which are recorded in column 3.

| Table accompanying Example 1 | | |
|---|---|---|
| Column 1 | Column 2 | Column 3 |
| 1-Hydroxy-6-amino-naphthalene-3,5-disulphonic acid | 2-Methylsulphonyl-benzthiazole-5-carboxylic acid chloride | Scarlet |
| " | 1,4-Dichlorophthalazine-6-carboxylic acid chloride | " |
| " | 2,3-Dichloroquinoxaline-6-sulphonic acid chloride | " |
| " | 4-(4′,5′-Dichloropyridazon-6′-yl-1′)-phenylcarboxylic acid chloride | " |
| 1-Hydroxy-6-amino-naphthalene-3-sulphonic acid | Cyanuryl chloride | " |
| " | Tetrachloropyrimidine | " |
| " | 2-Methylsulphonyl-4,5-dichloro-6-methylpyrimidine | " |
| " | 2,4,6-Trifluoro-5-chloro-pyrimidine | " |
| " | 2,4-Dichlor-6-amino-triazine | " |
| " | 2,4-Dichloro-6-methoxy-triazine | " |
| " | 2,4-Dichlor-6-anilino-triazine | " |
| " | β-(4′,5′-Dichloropyridazon-6′-yl-1′)-ethylcarboxylic acid chloride | " |
| " | 3-Chloropropionic acid chloride | " |
| " | 3-Phenylsulphonylpropionic acid chloride | " |
| 1-Hydroxy-6-amino-naphthalene-3-sulphonic acid | β-Methylsulphonyl-acrylic acid chloride | " |
| " | α-Bromacrylic acid chloride | " |
| 1-Amino-8-hydroxy-naphthalene-4,6-disulphonic acid | 2,3-Dichloroquinoxaline-6-carboxylic acid chloride | Bluish-tinged red |
| 1-Amino-8-hydroxy-naphthalene,4,6-disulphonic acid | 1,4-Dichlorophthalazine-6-carboxylic acid chloride | " |

Table accompanying Example 1

| Column 1 | Column 2 | Column 3 |
| --- | --- | --- |
| 1-Amino-8-hydroxy-naphthalene-3,6-disulphonic acid | 2,3-Dichloroquinoxaline-6-carboxylic acid chloride | " |
| 1-Amino-8-hydroxy-naphthalene-3,6-disulphonic acid | 2-Methylsulphonyl-benzthiazole-5-carboxylic acid chloride | " |
| 1-Amino-8-hydroxy-naphthalene-3,6-disulphonic acid | 4-(4',5'-Dichloropyridazon-6'-yl-1')-phenylcarboxylic acid chloride | " |
| 1-(3-Aminophenyl)-3-methyl-pyrazolone-(5) | 2,3-Dichloroquinoxaline-6-carboxylic acid chloride | Yellow |
| 1-(4-Aminophenyl)-3-methyl-pyrazolone-(5) | " | " |
| 1-(3-Aminophenyl)-pyrazolone-(5)-carboxylic acid-(3) | " | Golden yellow |
| 1-Hydroxy-7-amino-naphthalene-3,6-disulphonic acid | " | Red |
| 1-Hydroxy-7-amino-naphthalene-3-sulphonic acid | " | " |
| 1-(4-Aminophenyl)-3-methyl-5-amino-pyrazole | " | Yellow |

EXAMPLE 3

53,3 parts of the dyestuff of formula

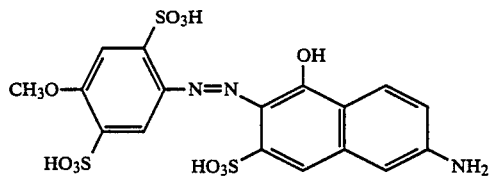

are dissolved in 1000 parts by volume of water under neutral conditions and warmed to 40° C. 28 parts of 2,3-dichloroquinoxaline-6-carboxylic acid chloride are sprinkled into the solution. The hydrochloric acid liberated during the condensation is neutralised with dilute sodium hydroxide solution. After completion of the acylation, the mixture is clarified and the dyestuff is separated out from the filtrate by adding sodium chloride. After drying at 70° C. in a vacuum drying cabinet, and grinding, a light red powder is obtained. In the form of the free sulphonic acid, the dyestuff corresponds to the following formula:

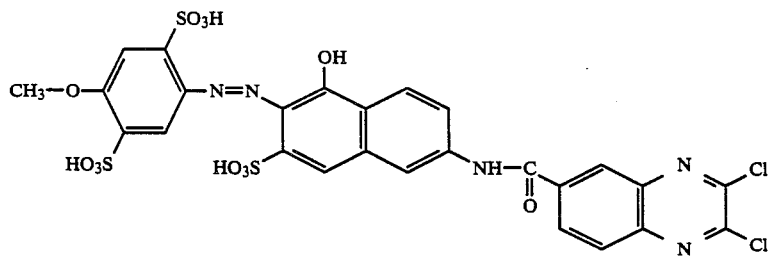

Brilliant scarlet shades are obtained on cotton with this dyestuff according to one of the application processes usual for reactive dyestuffs for cotton.

EXAMPLE 4

51.7 parts of the dyestuff of formula

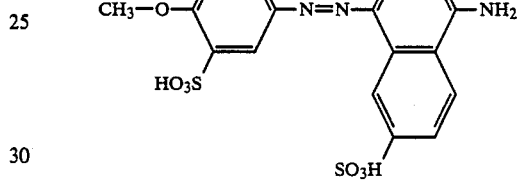

are dissolved in 1000 parts by volume of water under neutral conditions and warmed to 40° C. 30 parts of 2,5-dichloroquinoxaline-6-carboxylic acid chloride are sprinkled into the solution and the pH-value is kept in the neutral range by adding dilute sodium hydroxide solution. After completion of the condensation, the mixture is clarified and the dyestuff salted out. After drying and grinding a yellow dyestuff powder is obtained. In the form of the free sulphonic acid, the dyestuff corresponds to the following composition:

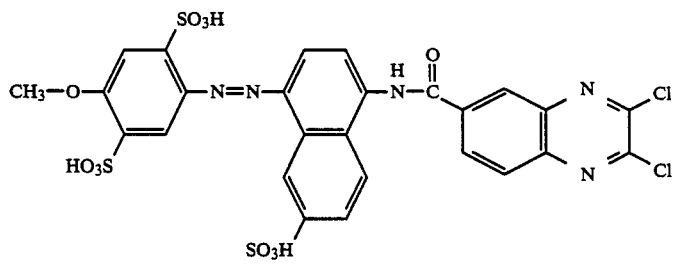

It dyes cotton in golden yellow shades having very good fastness properties.

If the instructions of this example are followed but the reactive components listed in column 2 of the table are employed instead of 2,3-dichloroquinoxaline-6-carboxylic acid chloride and the coupling components listed below are employed instead of 1-amino-naphthalene-6-sulphonic acid, valuable dyestuffs are again obtained, which dye cotton in reddish-tinged yellow shades: 1-amino-naphthalene-7-sulphonic acid, 1-amino-naphthalene-8-sulphonic acid, 1-amino-2-ethoxy-naphthalene-6-sulphonic acid, 1-amino-3-methyl-benzene, 1-amino-3-acetylamino-benzene and 1-amino-3-ureido-benzene.

acid chloride are sprinkled into the solution and the mixture is warmed to 45° C., with the pH-value being kept in the neutral range by simultaneous dropwise addition of 10% strength sodium carbonate solution. After completion of the condensation, the mixture is clarified and the dyestuff salted out. After drying and grinding a brown dyestuff powder is obtained. A strong reddish brown dyeing of good general fastness properties is obtained according to one of the application processes which are usual for reactive dyestuffs. In the form of the free sulphonic acid the product corresponds to the following formula

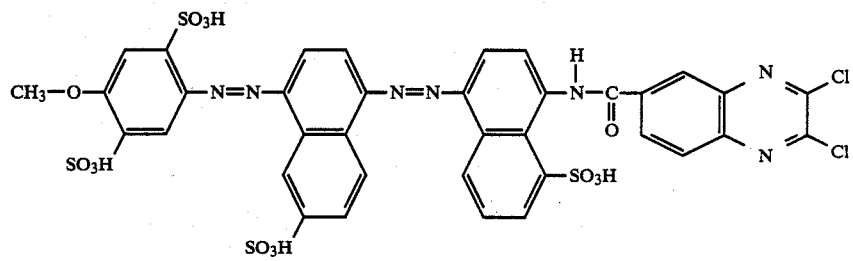

EXAMPLE 5

75.1 parts of the dyestuff of formula

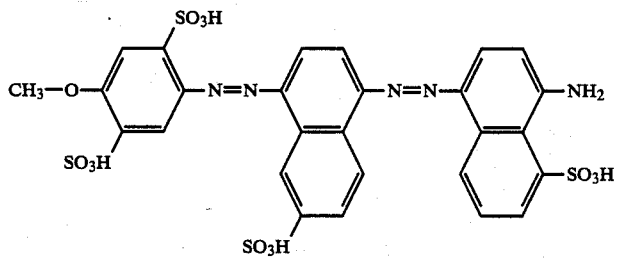

are dissolved in 1000 parts of water under neutral conditions. 28 parts of 2,3-dichloroquinoxaline-6-carboxylic Equally valuable dyestuffs which dye cellulose-containing material is reddish brown shades are obtained if instead of the product employed as the aminodisazo dyestuff in this example, the dyestuffs listed below are employed:

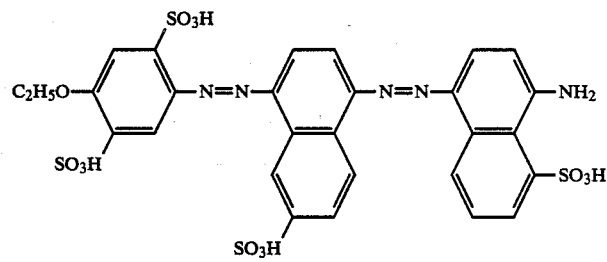

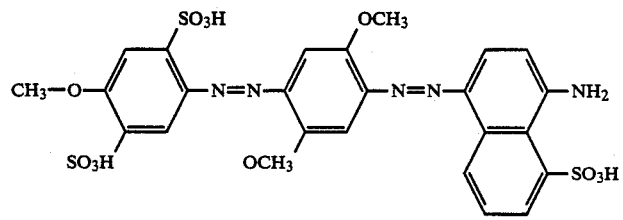

-continued

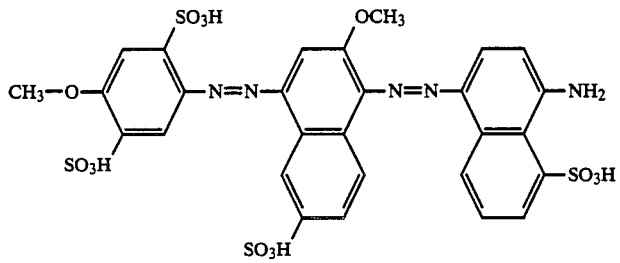

EXAMPLE 6

53.3 parts of the dyestuff of formula

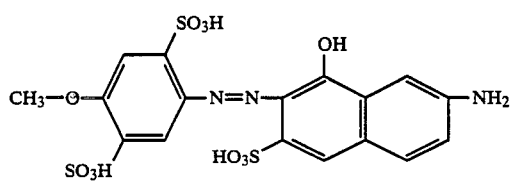

are dissolved in 1000 parts by volume of water under neutral conditions and warmed to 40° C. 28 parts of 2,3-dichloroquinoxaline-6-carboxylic acid chloride are sprinkled into the solution. The hydrochloric acid liberated during the condensation is neutralised with dilute sodium hydroxide solution. After completion of the acylation, the mixture is clarified and the dyestuff is separated out from the filtrate by adding sodium chloride. After drying and grinding a red dyestuff powder is obtained. In the form of the free sulphonic acid the dyestuff corresponds to the following formula This dyestuff yields a strong red on cellulose-containing material according to one of the application processes which are usual for reactive dyestuffs for cotton.

If the instructions of this example are followed but the reactive components listed in column 2 of the table of Example 1 are employed instead of 2,3-dichloroquinoxaline-6-carboxylic acid chloride, valuable reactive dyestuffs are again obtained which dye cotton in red shades.

EXAMPLE 7

74.3 parts of the aminoazo dyestuff of formula

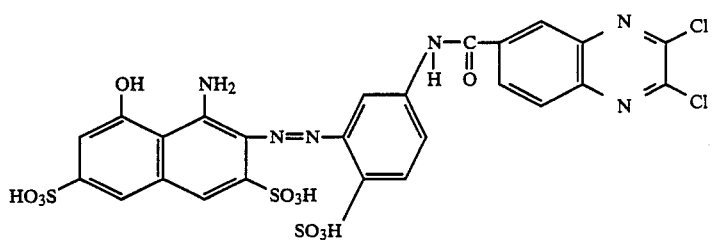

are stirred up with 1000 parts by volume of water under neutral conditions. The suspension of the diazo compound obtained by indirect diazotisation from 28 parts of 1-amino-4-methoxybenzenedisulphonic acid manufactured in accordance with the process described in the appendix to Example 1, is next introduced into the aqueous suspension of the coupling component, with a weakly alkaline pH-value being maintained by simultaneous dropwise addition of sodium carbonate solution.

After completion of coupling, the dyestuff is separated out by adding sodium chloride. After drying and grinding a black dyestuff powder is obtained. In the form of the free sulphonic acid the dyestuff corresponds to the following formula

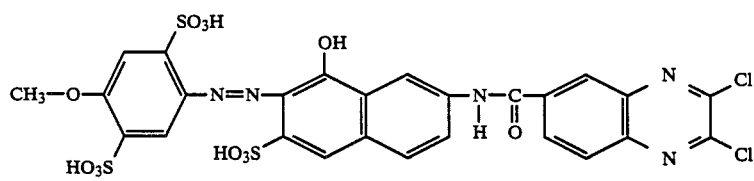

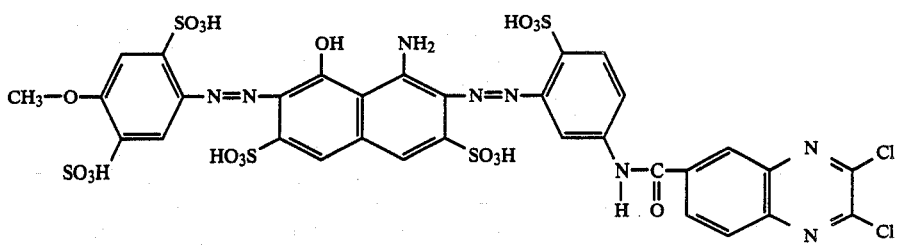

Strong blue colour shades are obtained on cellulose-containing materials according to one of the application processes which are usual for reactive dyestuffs for cotton.

Equally valuable dyestuffs which dye cotton in blue shades are obtained if instead of the monoazo dyestuff used in this example, the monoazo dyestuffs listed below are employed:

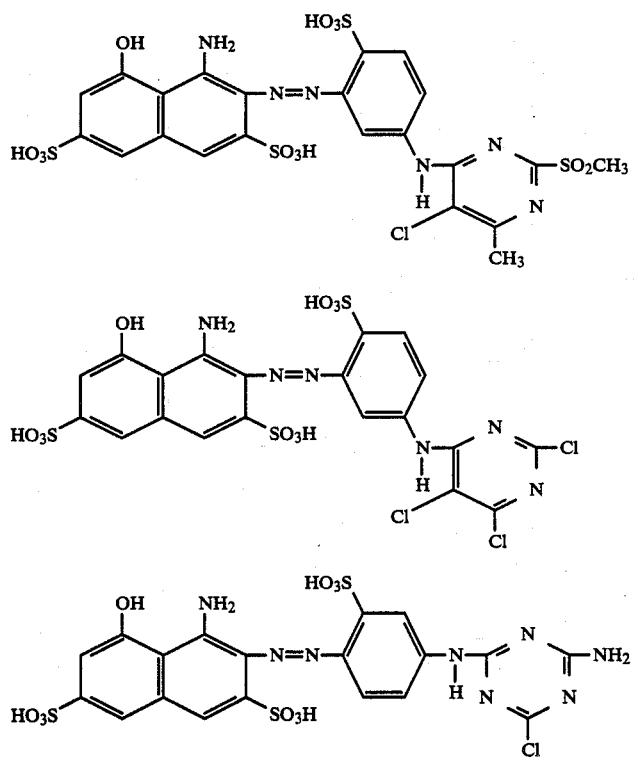

I claim:
1. A reactive dyestuff of the formula

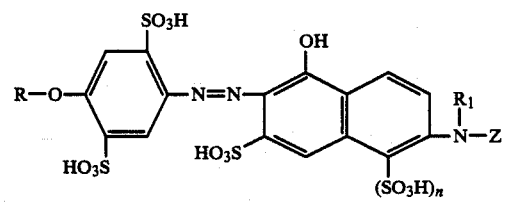

wherein
R is alkyl of 1–5 carbon atoms or cyclohexyl;
$R_1$ is hydrogen;
Z is monochlorotriazinyl further substituted by amino $C_1$–$C_3$-alkylamino, hydroxyethylamine, dihydroxethylamino, morpholine, piperidino, cyclohexylamino, phenylamino, carboxy- or sulphophenylamino, methoxy, ethoxy, phenylsulphonylmethoxy, phenoxy, sulphophenyloxy, methyl- or methoxy-phenyloxy, hydroxyethylmercapto, phenylmercapto, methyl-phenylmercapto, dinitrophenylmercapto, methyl or phenyl; and
n is 0 to 1.

2. A reactive dyestuff of claim 1 of the formula

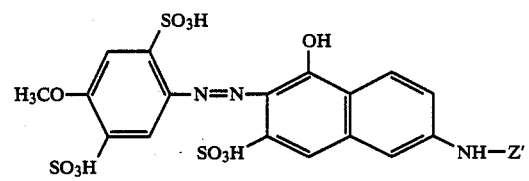

wherein
Z'=monochlorotriazinyl further substituted by amino, phenylamino, carboxy- or sulphophenylamino.

3. A reactive dyestuff of claim 2 wherein Z' is monochlorotriazinyl further substituted by phenylamino.

* * * * *

UNITED STATES PATENT AND TRADEMARK OFFICE
CERTIFICATE OF CORRECTION

PATENT NO. : 4,841,030
DATED : Jun. 20, 1989
INVENTOR(S) : Jäger

It is certified that error appears in the above-identified patent and that said Letters Patent is hereby corrected as shown below:

| | |
|---|---|
| Title Page, under "Abstract", before formula | Insert --New azo reactive dyestuffs corresponding to the general formula-- |
| Col. 16, line 34 | Delete "5" and substitute --3-- |
| Col. 17, line 6 | Insert --reactive-- after "valuable" |

Signed and Sealed this

Second Day of October, 1990

Attest:

HARRY F. MANBECK, JR.

Attesting Officer     Commissioner of Patents and Trademarks